W. ROUTLEDGE.
SCREW PROPELLER.
APPLICATION FILED DEC. 28, 1918.
1,304,102.
Patented May 20, 1919.
2 SHEETS—SHEET 2.
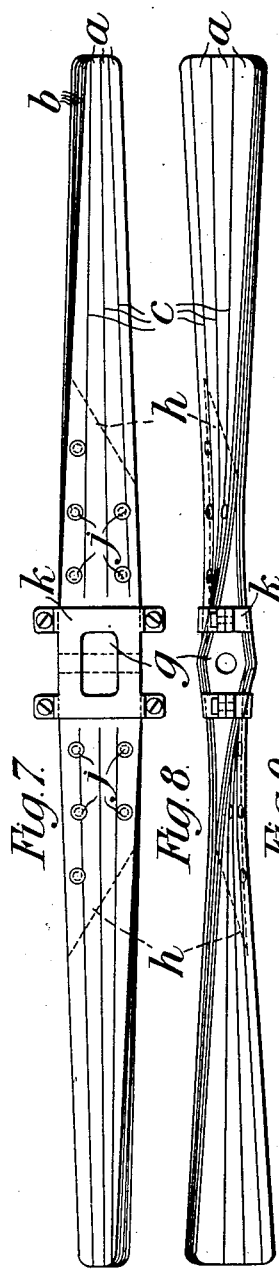
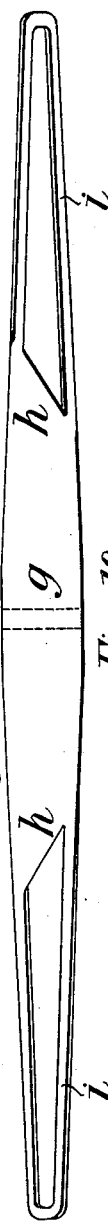
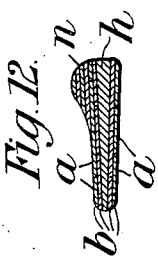
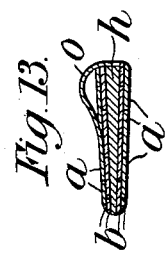
Witnesses.
J. K. Moore
R. E. Barry
Inventor.
William Routledge
by
Wheaton Crowd
attys.

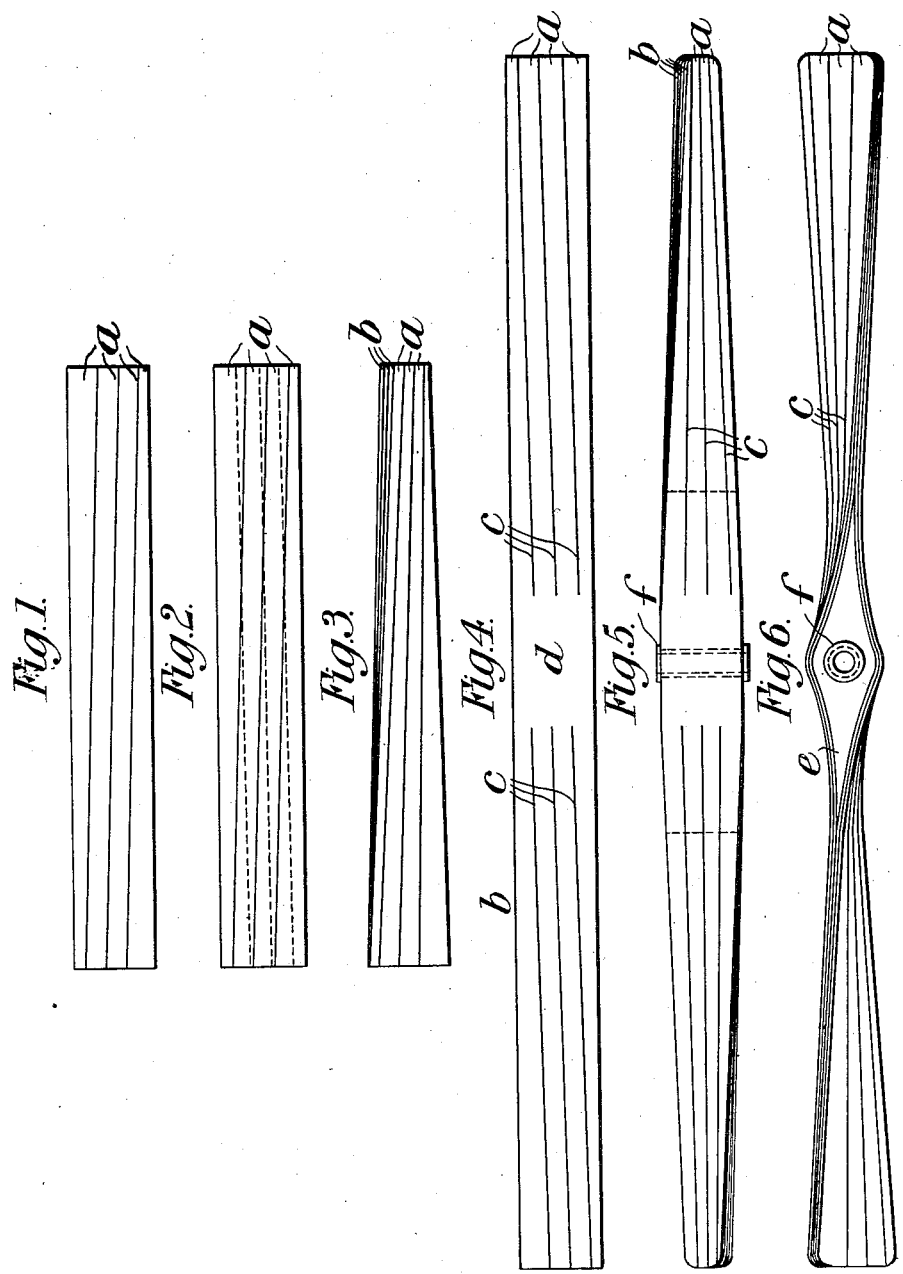

UNITED STATES PATENT OFFICE.

WILLIAM ROUTLEDGE, OF LONDON, ENGLAND.

SCREW-PROPELLER.

1,304,102.   Specification of Letters Patent.   Patented May 20, 1919.

Application filed December 28, 1918. Serial No. 268,731.

*To all whom it may concern:*

Be it known that I, WILLIAM ROUTLEDGE, A. M. I. E. E., a subject of the King of Great Britain, residing at 4 Laurel Bank, Hoop Lane, Golder's Green, London, England, have invented new and useful Improvements in Screw-Propellers, of which the following is a specification.

This invention relates to screw-propellers designed particularly for the propulsion of aircraft, and to that class of such propeller built up of a series of bars or layers of wood laid in the direction of the length of the blade.

Hitherto in constructing propellers of this class the layers or bars were of a breadth or thickness approximately equal to the thickness of the blade from face to face.

According to this invention each blade is built up of layers in the direction of its thickness, or parallel or substantially parallel to its helical surface, so that there are several layers between the two faces, the layer or layers constituting the opposite surfaces or sections of a blade being bent or molded to give the desired helical configuration and then secured together and to a center piece or boss.

One method of carrying out the invention consists in constructing each blade section of a series of strips which are laid on a former successively side by side until the full width of the blade is obtained, another layer, similarly composed of adjacent strips, being then applied and both being secured together by cement. As an additional means of security the layers may be held by clamping means, such as headless screws, rivets or the like.

Or, instead of composing each individual layer of a series of adjacent strips, I may make each layer of a single strip of the width of the blade, the said strips being brought to the requisite helical curvature by means of steaming and pressure, if necessary, or by being slit longitudinally into adjacent strips from the top to a point near the center part or boss.

Wood, vulcanized fiber, papier-mâché or like material may be built up, as above described, so as to form individual blades which may be connected to the center piece or boss in any suitable way. Or, the layers may be built up so as to form more than one integral blade, as for example, a pair of opposite blades in alinement with one another. Or, in the case of a three or more bladed propeller the complete propeller may be composed of three or more such laminated strips, each forming a half of two adjacent blades, the whole being secured to a suitable center-piece or boss say of wood. The halves constituting each blade may in practice be secured together mechanically as, for example, by screwing, keying or doweling so as to enable a broken blade to be easily replaced.

A further part of the invention consists in the employment in the construction of propellers, of a center-piece, or boss of metal, preferably aluminium, to which the blades are secured in any convenient way. The said center-piece is preferably made so that it increases in thickness from the trailing edge to the leading edge, and it is advantageously formed with wings or extensions which extend up more or less toward the tips of the blades, and may even be in the form of a frame extending completely around the outside edge of the blade, so as to separate the two opposite faces thereof.

To enable the invention to be fully understood I will describe it by reference to the accompanying drawing, in which:—

Figure 1 is a view showing a series of strips forming a layer of wood for application to a former.

Fig. 2 is a similar view showing two layers superposed.

Fig. 3 shows a propeller blade as built up from strips on a former.

Fig. 4 is a view illustrating a modified form of wood layer for the production of a double bladed propeller.

Fig. 5 is a view of the propeller made with a series of strips as shown in Fig. 4.

Fig. 6 is a view at right angles to Fig. 5.

Figs. 7 and 8 are views similar to Figs. 5 and 6 but showing a modified construction of propeller.

Fig. 9 is a plan view of one form of metal reinforcement.

Fig. 10 is a side view illustrating the metal or other center detached from the propeller shown in Figs. 7 and 8.

Fig. 11 is a view of a three bladed propeller constructed according to the invention, and Figs. 12 and 13 are transverse sections through the boss of a propeller illustrating two methods of shaping the leading edge.

$a$ indicates the strips of wood or other suitable material from which are formed the layers by building up a series of which a propeller blade is formed.

These layers are, as indicated in Fig. 1 preferably made with the outside strips tapering somewhat from end to end whereby the joints between the strips run diagonally across the propeller, and, in practice, the layers of strips are arranged so that the joints of the adjacent layers cross one another diagonally, as indicated by the full and dotted lines in Fig. 2, or at right angles, for the purpose of strengthening the finished blade. The intermediate strips are preferably made to gradually narrow toward the center of the blade to allow the edges to lie closely together on a helical surface.

As above described, the strips are placed individually and successively on a former so as to build up each layer, the strips and the layers being cemented together as they are placed in position so as to produce a blade such as is shown in Fig. 3, in which the individual layers are indicated by the letter $b$. Where a wood center piece is made use of the said center piece itself may constitute a part of the former.

Fig. 4 shows a layer $b$ made of a single piece of wood or the like slit longitudinally as indicated at $c$ so as to form a series of adjacent strips $a$ extending from each tip to a point near the center part or boss portion $d$. A series of layers of this construction are then molded on a former to the proper helical curvature, and are secured to a boss $e$ so as to constitute a double bladed propeller as indicated in Figs. 5 and 6. The boss $e$ is of wood and furnished with a central metal sleeve $f$.

In Figs. 7 and 8 the construction of propeller shown is similar to that indicated in Figs. 5 and 6 except that the wood boss $e$ is replaced by a metal boss or piece $g$ preferably of aluminium whereby it is possible to reduce the dimensions thereof. In the construction shown the said boss $g$ is furnished with wings or extensions $h$ as shown clearly in the detailed Figs. 9 and 10, and, in some cases, the said extensions may, as shown in Fig. 9, take the form of frames $i$ extending entirely around the outside edge of the blades as above described. The blades are advantageously secured to the boss $g$ by means of screws or rivets such as are shown at $j$ in Figs. 7 and 8 or a clamp such as is indicated at $k$ in the said figures.

Fig. 11 is a view illustrating the application of the invention to a three bladed propeller. In this case each layer or series of layers of wood or other material forms one half of the adjacent blades which are built up and secured together and to a central star shaped center or boss $g$ by means of the clamping plates $l$ and screws $m$.

Figs. 12 and 13 are transverse sections through blades at the root end and showing two methods of shaping the front face to provide the usual concave contour. In the construction shown in Fig. 12 this is effected by the application of layers of wood or the like $n$ to form a thickening at the front of the blade, at the leading edge, this thickening being shaped to give the desired contour.

In Fig. 13 the same result is attained by applying to the leading edge of the blade a shaped metal plate $o$ which is secured thereto in any convenient way.

In some cases the layers of wood or other material may be separated by a thin layer of canvas or the like in a well known manner.

I am aware that heretofore it has been proposed to apply veneers to the surface of a blade built up of a series of bars or layers extending from face to face of a blade and I do not claim such construction.

Having now particularly described and ascertained the nature of my said invention and in what manner the same is to be performed, I declare that what I claim is:—

1. A screw propeller having a blade built up of a series of layers of fibrous material, which are substantially parallel to its helical surface and which extend from the tip to the boss portion, substantially as hereinbefore described.

2. A screw propeller having a blade composed of a series of layers of fibrous material, which are substantially parallel to the helical surface of the blade and each of which is composed of a series of strips molded or formed to the proper helical curvature, substantially as described.

3. A screw propeller having a blade built up of a series of layers of fibrous material, which are substantially parallel to the helical surface of the blade, each layer having longitudinal slits extending from the tip to a point near the boss portion, substantially as hereinafter described.

4. A screw propeller having a blade built up of a series of layers of fibrous material, which are substantially parallel to the helical surface of the blade and each composed of a series of strips placed side by side, the strips of each layer extending at an angle or diagonally across the said layer and the joints of adjacent layers crossing one another, substantially as described.

5. In a screw propeller of the kind claimed in claim 1 the combination with the blades of a center piece or boss to which the blades are attached, the said boss having wings which extend substantially the entire length of the blades and form reinforcements for said blades.

WILLIAM ROUTLEDGE.